(12) United States Patent
Gsinn et al.

(10) Patent No.: US 7,880,361 B2
(45) Date of Patent: Feb. 1, 2011

(54) ELECTRICAL MACHINE WITH AN INSERTION DEVICE FOR A PERMANENT MAGNET BETWEEN POLE TOOTH HALVES AND CORRESPONDING PRODUCTION METHOD

(75) Inventors: Christian Gsinn, Nussdorf/Inn (DE); Hubert Schedler, Karlsfeld (DE)

(73) Assignee: Siemens Aktiengesellschaft, München (DE)

(*) Notice: Subject to any disclaimer, the term of this patent is extended or adjusted under 35 U.S.C. 154(b) by 248 days.

(21) Appl. No.: 12/066,734

(22) PCT Filed: Jan. 31, 2007

(86) PCT No.: PCT/EP2007/050943

§ 371 (c)(1),
(2), (4) Date: Mar. 13, 2008

(87) PCT Pub. No.: WO2007/099011

PCT Pub. Date: Sep. 7, 2007

(65) Prior Publication Data
US 2008/0252152 A1    Oct. 16, 2008

(30) Foreign Application Priority Data
Mar. 1, 2006   (DE) .................. 10 2006 009 439

(51) Int. Cl.
*H02K 1/27* (2006.01)
*H02K 1/06* (2006.01)
*H02K 15/03* (2006.01)

(52) U.S. Cl. .................. 310/216.088; 310/181; 310/216.104; 310/216.105; 310/216.082

(58) Field of Classification Search .............. 310/12.01, 310/12.24–12.26, 156.08, 156.18, 156.53, 310/156.54, 156.56, 181, 216.023, 216.029, 310/216.031, 216.038, 216.057, 216.074, 310/216.079, 216.082, 216.104–216.105, 310/216.109, 43, 194, 216.088; 29/596–598
See application file for complete search history.

(56) References Cited

U.S. PATENT DOCUMENTS

| | | | | |
|---|---|---|---|---|
| 3,788,447 A | * | 1/1974 | Stephanoff | 198/619 |
| 4,504,750 A | * | 3/1985 | Onodera et al. | 310/12.21 |
| 4,588,914 A | * | 5/1986 | Heyne | 310/156.11 |
| 5,973,435 A | * | 10/1999 | Irie et al. | 310/263 |

(Continued)

FOREIGN PATENT DOCUMENTS

DE        19748678 C2    1/2002

(Continued)

*Primary Examiner*—Tran N Nguyen
(74) *Attorney, Agent, or Firm*—Henry M. Feiereisen; Ursula B. Day

(57) ABSTRACT

The manufacturing effort for producing electrical machines with pole teeth which are fitted with permanent magnets is intended to be simplified. The permanent magnets are inserted into the pole teeth only at the end of the manufacturing process, for this purpose, with the pole teeth each comprising two pole teeth halves (1, 2). An insertion device (3) which may be in the form of a frame is arranged between the pole teeth halves (1, 2). The insertion device (3) is used to keep a space free for the individual permanent magnets during the assembly process. By way of example, this allows the pole teeth to be wound without permanent magnets interfering with this manufacturing step. Permanent magnets are finally inserted into the insertion devices.

8 Claims, 2 Drawing Sheets

U.S. PATENT DOCUMENTS 5,994,814 A * 11/1999 Kawabata et al. ..... 310/216.062
6,756,870 B2 * 6/2004 Kuwahara ................... 335/224

FOREIGN PATENT DOCUMENTS

| DE | 10 2004 045 992 | | 4/2006 |
| --- | --- | --- | --- |
| JP | 60241767 | A | 11/1985 |
| JP | 01047258 | A | 2/1989 |
| JP | 2002199679 | A * | 7/2002 |
| WO | WO 02/054566 | A1 | 7/2002 |
| WO | WO 03/058794 | A1 | 7/2003 |
| WO | WO 2005/064767 | A1 | 7/2005 |

* cited by examiner

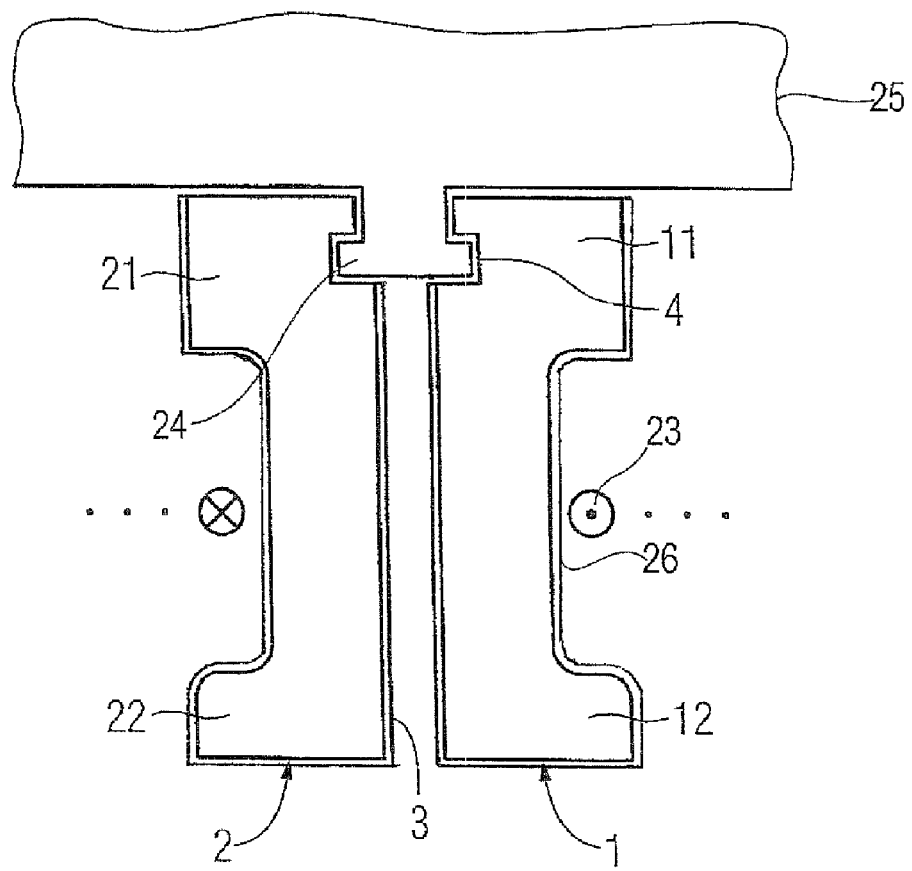

ELECTRICAL MACHINE WITH AN INSERTION DEVICE FOR A PERMANENT MAGNET BETWEEN POLE TOOTH HALVES AND CORRESPONDING PRODUCTION METHOD

BACKGROUND OF THE INVENTION

The present invention relates to an electrical machine with a first active part, which has at least one pole tooth, which is fitted with a permanent magnet, and a second active part, which is magnetically and operatively connected to the first active part such that they can move relative to one another. Furthermore, the present invention relates to a corresponding method for producing a pole tooth of an electrical machine. The term "active part" is in this case understood to mean, for example, a primary part or a secondary part of a linear motor or else a stator or rotor of a torque motor. The problem and the solution of the present invention are in this case principally illustrated using a linear motor, however.

Synchronous linear motors with magnets arranged in the air gap are known. Furthermore, synchronous linear motors have also been developed in which the magnets are embedded in the pole teeth of the primary part. Subsequent magnetization of the magnet blanks results in an increased manufacturing complexity. Ready-magnetized permanent magnets should therefore be used. In order to integrate these permanent magnets as late as possible into the manufacturing process, it is necessary to change the cut of the motor laminates. One disadvantage with such synchronous linear motors with embedded permanent magnets, however, is the fact that manufacture needs to take place with a great deal of care and considerable complexity.

SUMMARY OF THE INVENTION

The object of the present invention therefore consists in proposing a construction of an electrical machine and a corresponding method for producing pole teeth with which it is possible to integrate the permanent magnets as late as possible into the manufacturing process.

According to the invention, this object is achieved by an electrical machine with a pole tooth, which is fitted with a permanent magnet, the pole tooth having two pole tooth halves, an insertion device being arranged between the pole tooth halves and a permanent magnet being inserted into the insertion device.

Furthermore, the invention provides a method for producing a pole tooth of an electrical machine by means of the provision of two pole tooth halves, the introduction of an insertion device between the two pole tooth halves and the introduction of a permanent magnet into the insertion device.

Advantageously, the fitting of the teeth and the winding of the teeth or the application of coils onto the teeth can therefore be markedly simplified since the pole teeth are still nonmagnetic in these manufacturing steps.

Preferably, the insertion device comprises a hollow-cylindrical frame having a rectangular cross section. This frame not only serves the purpose of maintaining the distance between the pole tooth halves during fitting, but preferably also of fixing the permanent magnet without play in the pocket or the gap between the pole tooth halves.

The insertion device can be nonmagnetic. In particular, it is advantageous if it is manufactured from plastic. It can therefore be produced as a favorable plastic injection-molded part, it being possible at the same time to maintain narrow tolerances.

Furthermore, it may be advantageous if the insertion device at least partially covers an outer face of a pole tooth half. The insertion device can therefore not only be used for protecting the pole tooth halves or laminate stack but also, for example, as a winding support.

In a special configuration, insertion frames for a plurality of pole teeth can be integrally connected to one another. In this way, tooth modules to be fitted can be produced in a favorable manner.

The electrical machine according to the invention can be in the form of a linear motor, the pole tooth being formed on the primary part. The primary parts of linear motors can therefore be produced in a cost-effective manner, in which motors the secondary parts comprise nonmagnetized toothed racks.

BRIEF DESCRIPTION OF THE DRAWING

The present invention will now be explained in more detail with reference to the attached drawing, which shows a perspective view of a pole tooth with the insertion frame introduced.

The exemplary embodiments described in more detail below represent preferred embodiments of the present invention. The drawings show in:

FIG. 2 a schematic illustration of the pole tooth with winding and attachment to a support.

DETAILED DESCRIPTION OF PREFFERRED EMBODIMENTS

Figure 1:
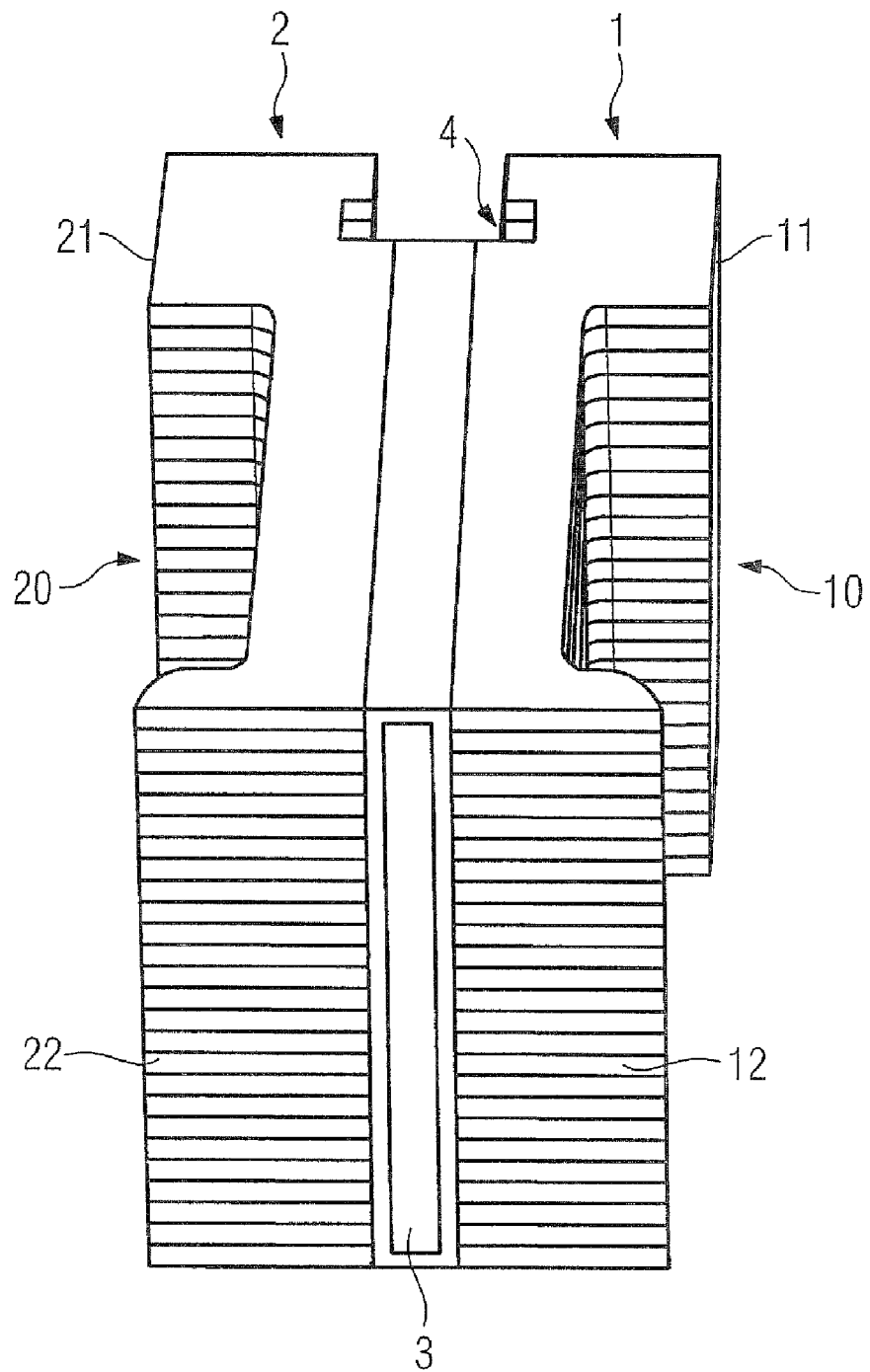
FIG. 1 a perspective view of a pole tooth according to the invention.

In principle, the advantages of the invention can be utilized for all electrical machines which have pole teeth. Typically, torque motors, linear motors and generators are equipped with pole teeth on the active part and/or passive part or on the primary part and/or secondary part. The following exemplary embodiments merely relate to linear motors, by way of example.

The pole tooth reproduced in FIG. 1 comprises two pole tooth halves 1 and 2. These pole tooth halves 1, 2 are in this case in the form of laminate stacks. They have an approximately C-shaped form in cross section. In their central region 10, 20, the pole tooth halves 1, 2 are configured in the form of plates. The one ends 11, 21, of the pole tooth halves together form the pole tooth head and the other ends 12, 22 of the pole tooth halves together form the pole tooth shoe. The tapered region in the center 10, 20 serves the purpose of accommodating a winding 23, which is schematically illustrated in FIG. 2.

An insertion frame 3 is located between the two pole tooth halves 1, 2. This insertion frame 3 forms a square in its outer contour. On the inside, it is hollow and it is open at the bottom, i.e. in the case of the pole tooth shoe 12, 22, which points towards the secondary part of the linear motor. From this side, a permanent magnet, which is likewise not illustrated, can then be introduced into the cavity of the insertion frame 3. If appropriate, the insertion frame is also open towards the tooth head, with the result that the permanent magnet can be inserted from there. The insertion frame 3 extends over the entire area of a pole tooth half 1, 2, which faces the respective other pole tooth half. In the exemplary embodiment in FIG. 1, only one slot in the pole tooth head 11, 21 has been cut out thereof. This slot 4 serves the purpose of fastening the pole tooth 24 on a corresponding support 25.

The nonmagnetic insertion frame 3, which consists of plastic, for example, in the laminate stack makes it possible to implement the plurality of manufacturing steps for the primary part without needing to integrate the permanent magnet(s) straight into the laminate stack or the tooth of the primary part. Instead, the assembly of the tooth first takes place when the frame without the magnets is installed. The following manufacturing steps, namely the fitting of the coils or the winding of the teeth and the fitting of the teeth, then take place with the frame 3 installed. The cavity created by the frame 3 is maintained during the manufacturing process. At a subsequent point in the manufacturing process, for example once the teeth have been fitted or once the winding has been carried out, the magnet(s) are then inserted into the frame 3.

As a further embodiment, a plastic casing 26 can be cast integrally with the insertion frame 3, as shown in FIG. 2. This plastic casing 26 surrounds the two pole tooth halves at least in the tapered central region 10, 20. For manufacturing purposes, the laminate stacks of the pole tooth halves are inserted into an injection-molding machine. In the corresponding die, the laminates are encapsulated. The frame can be fitted as a separate part or can be cast with the laminate stacks in the injection-molding machine. Individual laminate stacks are therefore produced which are connected to one another via the plastic to form one or more teeth. As a result of the insertion frame, in each case one cavity is maintained between the respective half teeth, which cavity can then be used further as above.

In accordance with a further alternative embodiment, the insertion device can have fixing elements, with which the pole tooth halves can be fastened on the insertion device. For example, shaped elements can be integrally formed on the insertion frame for plugging or snapping purposes, with which shaped elements the two pole tooth halves can then be fixed on the insertion frame for the purpose of simplifying fitting.

Advantageously, a dimensionally stable motor laminate stack can be constructed as a result of the nonmagnetic frame 3 according to the invention which contains a cavity. As a result, the handling of the individual fitting parts, the winding of the laminate stacks and the subsequent joining of the magnets is simplified or simply made possible.

What is claimed is:

1. An electrical machine, comprising:
    a pole tooth having two pole tooth halves which define opposite ends, with one of the ends of the pole tooth halves forming a pole tooth head, and with the other one of the ends of the pole tooth halves forming a pole tooth shoe;
    an insertion device arranged between the pole tooth halves to maintain a distance between the pole tooth halves, said insertion device being open at least in an area of the pole tooth shoe or the pole tooth head;
    a plastic casting formed in one piece with the insertion device to form a unitary structure configured to surround the pole tooth halves such as to at least partially cover an outer face of the pole tooth halves to serve as a winding support; and
    a permanent magnet inserted into the insertion device through the open area.

2. The electrical machine of claim 1, wherein the insertion device comprises a hollow-cylindrical frame with a rectangular cross section.

3. The electrical machine of claim 1, wherein the insertion device is nonmagnetic.

4. The electrical machine of claim 1, further comprising a plurality of said insertion device for a plurality of said pole tooth, said plurality of said insertion device being interconnected in single-piece configuration.

5. The electrical machine of claim 1, configured as a linear motor having a primary part, said pole tooth being formed on the primary part.

6. A method for producing a pole tooth of an electrical machine, comprising the steps of:
    providing two pole tooth halves for formation of a pole tooth;
    placing the pole tooth halves in an injection mold;
    casting plastic material about the pole tooth halves such as to form a single-piece open-ended insertion device received between the two pole tooth halves to maintain a distance between the pole tooth halves and to at least partially cover an outer face of the pole tooth halves to serve as a winding support; and
    introducing a permanent magnet through the open end into the insertion device after the insertion device is placed between the two pole tooth halves.

7. The method of claim 6, further comprising the step of providing the pole tooth with a winding prior to the introduction of the permanent magnet.

8. The method of claim 6, further comprising the step of mounting the pole tooth to a support prior to the introduction of the permanent magnet.

* * * * *